Patented July 16, 1946

2,404,033

UNITED STATES PATENT OFFICE 2,404,033

A CELLULOSE ESTER COMPOSITION CONTAINING A ROSIN ESTER AND THE METHOD OF PREPARING SAID ROSIN ESTER

Harry Burrell, Paramus, N. J., assignor, by mesne assignments, to Heyden Chemical Corporation, New York, N. Y., a corporation of Delaware No Drawing. Application February 3, 1943, Serial No. 474,551

22 Claims. (Cl. 106—173)

This invention relates to rosin esters of pentaerythritol and polypentaerythritols which are modified in such manner as to be compatible with nitrocellulose, and to processes for preparing the same.

Pentaerythritol tetraabietate has been known to the art for some years, and its preparation and properties are quite familiar. It has been recorded, and has been determined by experiment, that pentaerythritol tetraabietate is not compatible with nitrocellulose (see T. Crebert, Fette u. Seifen, volume 46, pages 287–292). Such incompatibility is manifested by dissolving nitrocellulose and pentaerythritol tetraabietate in a mutual solvent and allowing a film of such a mixture to be deposited on glass by evaporation of the mutual solvent. Such a film is cloudy or opaque instead of being transparent, as would be the case if the pentaerythritol tetraabietate and nitrocellulose were compatible. Some workers have described the preparation of lacquers from pentaerythritol tetraabietate, and while it is true that such products can be formulated, the films from such lacquers are invariably milky, cloudy, or opaque. The technical state of the art up to the time of this invention is illustrated by the following experiments.

*Experiment A.*—To identical individual samples of a 10 per cent solution of nitrocellulose in butyl acetate, such amounts of the rosin esters listed below were added that the dried films obtained by evaporating the solvent contained 10 per cent, 25 per cent, and 67 per cent rosin ester (based on the weight of nitrocellulose) respectively. The rosin esters used were:

Pentaerythritol tetraabietate.
Dipentaerythritol hexaabietate.
Pleopentaerythritol complete abietate.

The solutions were allowed to stand in stoppered containers until the resin had completely dissolved. Films of these solutions were then poured on glass slides and allowed to drain and dry. In every case the resulting film was milky or cloudy, showing that none of the foregoing resins was compatible with nitrocellulose.

*Experiment B.*—A lacquer was prepared by mixing together

| | Parts |
|---|---|
| Butyl acetate | 32 |
| Nitrocellulose (dry weight) | 8 |
| Pentaerythritol tetraabietate | 4.02 |
| Dibutyl phthalate | 1.34 |

When the solution had become homogeneous, films were poured on glass and allowed to drain and dry. Films so prepared were cloudy, showing that even in the presence of a high-boiling solvent plasticizer such as dibutyl phthalate the pentaerythritol tetraabietate remained incompatible with nitrocellulose.

*Experiment C.*—The following ingredients were compounded into a lacquer:

| | Parts |
|---|---|
| a. Nitrocellulose (wet with alcohol: 70% solids) | 25.6 |
| b. Butanol | 12.4 |
| c. Butyl acetate | 60.0 |
| d. Ethyl alcohol | 8.0 |
| e. Toluene | 70.0 |
| f. Pentaerythritol tetraabietate | 20.0 |
| g. Castor oil | 4.0 |
| Total | 200.0 |

The procedure of compounding the lacquer was to mix the butanol (b), butyl acetate (c), and ethyl alcohol (d), and in this mixture of solvents first nitrocellulose (a) and then the castor oil (g) were dissolved. The pentaerythritol tetraabietate (f) was separately dissolved in the toluene (e), and then this solution was added to the solution of the nitrocellulose in the solvent slowly and with constant stirring. The resultant lacquer was clear and homogeneous.

When a film of this lacquer was poured on glass and allowed to drain and dry, the resultant dried film was cloudy or "blushed." When the lacquer was allowed to dry under such conditions that a relatively thick film was formed, this thick layer of lacquer was opaque.

*Experiment D.*—The procedure of Experiment C was repeated, using in place of the pentaerythritol tetraabietate a commercial grade of pentaerythritol tetraabietate sold under the trade name "Pentalyn G." The results were identical, and the dried lacquer films showed that the Pentalyn was also incompatible with nitrocellulose.

These experiments confirm the statement in the article by T. Crebert that pentaerythritol abietate is not compatible with nitrocellulose. Consequently, from the practical aspect, unmodified ester gums prepared with pentaerythritol cannot be used in nitrocellulose-base lacquers. Such use is precluded because the lacquers would form cloudy or opaque films on the articles to which they were applied. This would be a serious defect, especially in furniture finishes, where highly polished, transparent, glass-like surfaces are desired. The so-called "rubbed" finishes for wood which give the effect of being a very thick or deep coating depend on a transparent nitrocellulose-base lacquer, and naturally this type of finish could not be prepared if pentaerythritol abietate were used as the resinous ingredient.

The high melting point and hardness of unmodified pentaerythritol esters of rosin are well known, and these properties make esters of this class very desirable as compounding ingredients in the preparation of nitrocellulose lacquers, particularly as contrasted with the low-melting and relatively soft ester gums prepared from glycerol. A hard resin which is frequently used in nitrocellulose lacquers is Batavia dammar, which is a natural resin imported into the United States. In time of economic stress the supply of dammar is greatly curtailed or entirely cut off, so that a hard, synthetic product for replacing dammar is very much desired by the lacquer industry. The modified rosin esters of this invention satisfy these requirements, and indeed are superior in color, clarity, hardness, and refractive index to other resins heretofore used, either natural or synthetic.

The resins of this invention are prepared by partially esterifying pentaerythritol or a polypentaerythritol with rosin and then completing the esterification with a partial ester of a polybasic organic acid, and preferably a half ester of a dicarboxylic acid.

In the manufacture of pentaerythritol by the condensation of acetaldehyde and formaldehyde, in addition to the pentaerythritol itself, smaller amounts of related hydroxylated substances are also obtained. One of these, which is obtained in a considerable amount, is dipentaerythritol, which is an ether having the following structure:

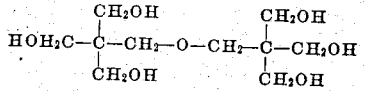

(see Brün, "Ueber den Dipentaerythrit," Wilhelm Greven, Krefeld, 1930).

Another related hydroxylated substance, obtained in somewhat smaller amounts, is white and crystalline, melts at 230–240° C., and has a hydroxyl content of 33%. It is related to dipentaerythritol in that it contains pentaerythritol residues bound by ether linkages. Regardless of chemical structure, for purposes of definition in this specification and in the claims, this substance will be termed "pleopentaerythritol."

According to the best evidence available, pleopentaerythritol is probably a mixture of dipentaerythritol, tripentaerythritol, and possibly additional related alcohols.

Dipentaerythritol, tripentaerythritol, and pleopentaerythritol may be grouped together under the generic term "polypentaerythritols," by which term is meant those compounds having higher molecular weights than pentaerythritol which are formed either actually or theoretically by etherifying one or more of the hydroxyl groups of pentaerythritol with other pentaerythritol residues.

In preparing the rosin esters of this invention, either pentaerythritol, polypentaerythritols or mixtures of these, such as may occur in technical grades of pentaerythritol, may be used. The proportion of such polyhydric alcohol or mixtures of such alcohols to be used may be calculated on the basis of the hydroxyl content as determined by one of the known analytical methods for determination of hydroxyl groups. Knowing the hydroxyl value of the alcohol used, it should be reacted with the acidic constituents in stoichiometric proportions, or if desired in a slight excess, say 5 or 10 mol per cent.

The rosin used may be either wood rosin, gum rosin, or any of the other several types and grades of rosins which are available. The reacting proportions of rosin required may be determined by the acid number of the rosin. Sufficient rosin should be used to esterify at least one hydroxyl group on the pentaerythritol-type alcohol, but the amount of rosin should be limited so that all of the available hydroxyl groups are not esterified by rosin. A convenient and desirable proportion to use is that amount of rosin which will esterify about 75 per cent of the available hydroxyl groups. In the case of pure pentaerythritol this would correspond to pentaerythritol triabietate. It is not necessary to limit this proportion to 75 per cent, however, and in some cases an amount of rosin may be used which will esterify about 85 or 90 per cent of the available hydroxyl groups. In other cases it may be desirable to esterify only 50 per cent or less of the available hydroxyl groups with rosin. In general, the proportion of rosin which is used with pentaerythritol should be within the range of approximately 25% to approximately 91% of that amount required stoichiometrically for esterification of all the available hydroxyl radicals. In the cases of polypentaerythritols and mixtures of polypentaerythritols and pentaerythritol, this proportion may be varied slightly outside these limits, since the amount required to esterify one hydroxyl group is less than 25% of the amount required stoichiometrically for esterification of all the available hydroxyl radicals in said compounds. These partial rosin esters should be considered as intermediates in the preparation of the resins of this invention; in one mode of procedure they are actual intermediates, whereas in another mode where the reactions are simultaneous, they are perhaps only theoretical intermediates.

The polybasic organic acids suitable for preparation of the resins of this invention include straight or branch chain dicarboxylic acids such as succinic, malic, tartaric, maleic, fumaric, citric, glutaric, adipic, pimelic, suberic, azelaic, sebacic, and similar homologous and related acids, as well as diglycolic, methylene disalicylic, phthalic, isophthalic, terephthalic, tetrahydrophthalic, endomethylene tetrahydrophthalic, diphenic, naphthalic, and the like, as well as tribasic organic acids. The anhydrides of these acids may also be used, and in many instances are preferable to the acid themselves. It has been found that oxalic acid is not suitable for the production of the modified rosin esters of this invention.

It should be noted that the form in which these carboxylic acids are combined with the resins of this invention is that of the half ester of a monohydric alcohol. This half ester may be formed before reacting with the pentaerythritol partial abietate, or it may be formed simultaneously or subsequently to the reaction with the partial rosin ester. It should also be noted that the products of this invention are not alkyd resins because of the fact that the half esters of the dibasic acids are the actual reacting ingredients, and therefore the cross-linking and growth of molecules is prevented; in other words, the dibasic acids used in this invention cannot be used to connect two polyhydric alcohol residues by esterification of the acidic groups of the polybasic acids, because all but one of these acidic groups is esterified with the monohydric alcohol. The rosin esters of this invention are quite different from alkyd resins both in chemical composition and in physical properties.

The monohydric alcohols used to form the half esters of the dibasic acid may be any straight or branch chain aliphatic alcohol, or they may be hydroaromatic or aromatic alcohols. The sole requirement is that they have but one reactive hydroxyl group per molecule. Alcohols which are suitable include methyl, ethyl, propyl, isopropyl, butyl, isobutyl, tertiary butyl, amyl and homologous and related alcohols, benzyl alcohol, cyclohexanol, etc.

In carrying out this invention one may separately prepare the partial ester of the pentaerythritol-type alcohol and the half ester of the dibasic acid, and subsequently react these two intermediate products. The amount of half ester of the dibasic acid to be used should be that which is theoretically required stoichiometrically for esterification of the remaining free hydroxyl groups in the pentaerythritol partial abietate by the remaining free carboxyl group of the half ester of the dibasic acid. This amount for pentaerythritol will be within the range of approximately 9% to 75% of that amount of half ester of the dibasic acid that is required stoichiometrically for the complete esterification of all the available hydroxyl radicals, and the actual amount within this range is dependent upon the amount of esterification that is to be effected by the rosin, so that the resulting product is a substantially completely esterified material containing substantially no free carboxyl or hydroxyl radicals. In the cases of polypentaerythritol and mixtures of polypentaerythritols and pentaerythritol, this proportion may be varied slightly outside these limits of 9% to 75%, as hereinbefore explained with respect to rosin. A deviation from this theoretical requirement by a few mol per cent is permissible, and in some cases desirable. It is not necessary, however, to prepare the pentaerythritol partial rosin esters and the half ester of the dibasic acid separately and before hand, since a one-step process in which all of the ingredients are reacted simultaneously is equally effective.

The exact modes of procedure are illustrated by the examples which follow. In general, reaction temperatures between 200 and 330° C. are desirable, and a temperature of approximately 250° C. is convenient. Adequate agitation is required during the preparation of the resins to avoid local overheating of the pentaerythritol-type alcohol. The time required for the esterification will vary with the temperature, the catalyst, use of auxiliary procedure to remove water, such as application of vacuum or use of an azeotropic solvent, and degree of agitation. The reaction should be continued until a product having a satisfactorily low acid number is obtained, unless it is desired to prepare a resin with a high acid number, in which case a slight excess of the partial ester of the polybasic organic acid should be used. Generally no catalysts are necessary for the preparation of the esters of this invention, but in the case of certain reactants a catalyst may be desirable, in which case paratoluenesulfonic acid, or a soluble calcium salt, or other metallic compounds such as are described in my copending applications, Serial Numbers 382,586 and 433,942, which have issued as Patents No. 2,360,393 and 2,360,394, respectively, may be used.

Although the products of the invention are referred to herein as rosin esters and as being specific rosin esters, such as pentaerythritol triabietate mono-(monobutyl phthalate), it is not to be understood that each is a single pure chemical compound. The products undoubtedly consist of mixtures of esters, in some of which simple esters of the polyhydric alcohol and abietic acid may be present. When high proportions of the half ester of the dibasic acid are used the product may be a mixture containing substantial amounts of substances which may not themselves be rosin esters.

The following examples are given for purposes of illustration only, and should not be so construed as to limit the invention in proportion or scope:

*Example 1.*—A partial ester of a technical grade of pentaerythritol having a hydroxyl value of 47.6 per cent was prepared by reacting 250 parts of rosin (approximately 0.725 equivalent proportion) with 34.5 parts of the pentaerythritol (approximately 0.966 equivalent proportion) at 250° C. for 5½ hours. In a separate reaction vessel the monobutyl ester of phthalic acid was prepared by refluxing together 35.6 parts of phthalic anhydride approximately 0.240 molecular proportion) with 18.0 parts of normal butanol (approximately 0.243 molecular proportion). The half ester of phthalic acid was then added to the partial rosin ester and the mixture was heated for 2 hours at 250° C.

The product, which is essentially pentaerythritol triabietate-mono-(monobutyl phthalate), was a hard, brittle, light-colored resin. When two parts of the resin were dissolved in butyl acetate, together with three parts of nitrocellulose, and the resultant solution was poured on glass slides and allowed to dry, the resultant film was perfectly transparent, and showed no signs of incompatibility. Such a film had a hardness of 6H, when tested by the Venus pencil method, or a Sward hardness of 64. The resin itself had a softening point of 92.0° C., when tested by the S. & W. (Stroock and Wittenberg) mercury method.

*Example 2.*—A partial rosin ester consisting essentially of pentaerythritol triabietate was prepared by reacting 250 parts of rosin with 34.5 parts of a technical grade of pentaerythritol having a hydroxyl value of 47.6 per cent. In a separate vessel 35.2 parts of adipic acid (approximately 0.241 molecular proportion) and 18 parts of butanol (approximately 0.243 molecular proportion) were reacted in the presence of 50 parts of xylene, which acted as an azeotropic solvent to remove the water of esterification. The reactants were heated together at the refluxing temperature, which was approximately 135° C., in an apparatus equipped with a trap for the removal of water of esterification for a total of six hours. The xylene was then distilled out of the reaction mixture by further heating for one hour. The butyl adipate so prepared was added to the previously prepared rosin ester and the mixture was heated for 1½ hours at 250° C., with constant agitation under an atmosphere of carbon dioxide.

The product, which is essentially pentaerythritol triabietate-mono-(monobutyl adipate) was a hard, brittle resin having a medium brown color and having an S. & W. mercury method softening point of 100.0° C. When mixed in a mutual solvent with 1.5 times its weight of nitrocellulose (dry), it proved to be completely compatible with the nitrocellulose when the solvent was allowed to evaporate. A film poured from such a mixture of the resin with nitrocellulose had a Sward hardness of 54.

*Example 3.*—A mixture of 24.1 parts of succinic anhydride (approximately 0.241 molecular proportion) and 18.0 parts of normal butanol (approximately 0.243 molecular proportion) were heated together under reflux for 4 hours. The product was then added to a prereacted mixture of 250 parts of rosin and 34.5 parts of technical pentaerythritol, which is essentially pentaerythritol triabietate, and the whole was heated for 3¼ hours at an average temperature of 250° C., under an atmosphere of carbon dioxide.

The product which is essentially pentaerythritol triabietate mono-(monobutyl succinate) was a hard, tough, light-brown-colored resin which was compatible with nitrocellulose when mixed therewith to the extent of 67 per cent based on the nitrocellulose.

*Example 4.*—The partial rosin ester of a dipentaerythritol having a hydroxyl value of 39.0 per cent was prepared by reacting 250 parts of rosin (approximately 0.725 equivalent proportion) with 42.2 parts of the dipentaerythritol (approximately 0.97 equivalent proportion). This reaction was carried out by heating the ingredients at 250° C. for 3 hours under an atmosphere of carbon dioxide, and with constant agitation. In a separate vessel 35.6 parts of phthalic anhydride (approximately 0.240 molecular proportion) were heated under reflux with 18.0 parts of butanol (approximately 0.243 molecular proportion) for a total of 3 hours. The butanol-phthalic product, which is essentially monobutyl phthalate, was then added to the partial rosin ester, and the whole was heated for 2 hours further at 250° C.

The resulting resin, which is essentially dipentaerythritol tetraabietate-di-(monobutyl phthalate), was a medium-brown-colored, hard, transparent resin having an S. & W. mercury method softening point of 104° C. The resin was combined with 1.5 times its weight of dry nitrocellulose by dissolving in butyl acetate. The solution so prepared yielded nearly colorless, transparent films when applied to glass slides and allowed to drain and dry. The Sward hardness of such a film was 56.

*Example 5.*—This example illustrates a one-step process for preparing the resins of this invention. It should be noted that the technical pentaerythritol triabietate - mono - (monobutyl phthalate) so obtained is substantially identical with that produced according to Example 1.

The following ingredients were all charged into a reaction vessel equipped with an air condenser and an agitator driven by an electric motor:

| | Parts |
|---|---|
| Rosin | 250.0 |
| Technical pentaerythritol | 34.5 |
| Phthalic anhydride | 35.6 |
| Butanol | 20.0 |

The ingredients were heated together at an average temperature of approximately 145° C. for a total of 9 hours, after which the temperature was raised to 250° C., and heating continued for an additional 3 hours.

The product was a hard, light-brown, brittle resin. It was compatible with nitrocellulose when mixed therewith in a mutual solvent to the extent of 67 per cent of the weight of nitrocellulose.

*Example 6.*—Fifty (50) parts of a technical grade of pleopentaerythritol having a hydroxyl value of 34 per cent (approximately 1 equivalent proportion) were reacted with 250 parts of rosin (approximately 0.725 equivalent proportion) at 250° C. for 2 hours. To the partial ester so prepared a previously refluxed mixture of 35.6 parts of phthalic anhydride (approximately 0.240 molecular proportion) and 18.0 parts of butanol (approximately 0.243 molecular proportion) was added, and the whole was heated for an additional 2 hours at 250° C.

The product was a hard, brittle, reddish-brown resin having an S. & W. softening point of 124° C. When two parts of this resin were mixed with three parts of nitrocellulose and dissolved in a mutual solvent, the film deposited from such a solution was transparent, showing that the rosin ester was compatible with the nitrocellulose. The Sward hardness of such a film was 78.

*Example 7.*—A pentaerythritol polyabietate in which approximately 86.6% of the hydroxyl radicals are esterified by rosin was prepared by heating together 250 parts of rosin having an acid number of 162 (approximately 0.725 equivalent proportion) with 28.8 parts of purified pentaerythritol having a hydroxyl value of 49.4 (approximately 0.837 equivalent proportion) for 3 hours, at an average temperature of 255° C. At the same time in a separate vessel 10.8 parts of maleic anhydride (approximately 0.110 molecular proportion) were heated under reflux with 8.2 parts of butanol (approximately 0.111 molecular proportion). The butanol-maleic reaction mixture was added to the pentaerythritol triabietate, and the whole was further heated at 250° C. for 2 hours.

The product was a hard, light-brown, brittle resin which was compatible at least to the extent of 67 per cent, based on nitrocellulose.

*Example 8.*—Two hundred fifty (250) parts of rosin having an acid number of 162 were heated at 250° C. for 3 hours with 34.5 parts of technical pentaerythritol having a hydroxyl value of 47.6 per cent. To the partial ester so prepared, which consists essentially of pentaerythritol triabietate, was added the reaction product of 35.6 parts of phthalic anhydride (approximately 0.240 molecular equivalent) with 12.0 parts of ethyl alcohol (approximately 0.261 molecular equivalent), said reaction product having been made by refluxing the ingredients together for 6 hours at the boiling point. The mixture of the partial ester and the monoethyl phthalate was then heated for 2 hours at 250° C.

The product so obtained, which is essentially pentaerythritol triabietate - mono - (monoethyl phthalate), was a medium-brown-colored, hard, brittle resin which was compatible with 1.5 times its weight of nitrocellulose when deposited as a film from a mutual solvent.

*Example 9.*—A mixture of 35.6 parts of phthalic anhydride (approximately 0.240 molecular proportion) and 21.5 parts of normal amyl alcohol (approximately 0.242 molecular proportion) was heated under reflux for 5¼ hours. The product so obtained, which was essentially mono-n-amyl phthalate, was then added to a partial ester of rosin which had been previously prepared by reacting 250 parts of rosin with 34.5 parts of technical pentaerythritol. The mixture of the two intermediates was further heated for 2 hours at 250° C. with constant stirring under an atmosphere of carbon dioxide.

The product so prepared, which was essentially pentaerythritol triabietate-mono-(mono-n-amyl phthalate), was a light-colored, transparent, hard resin which had an S. & W. softening point of 96° C. The resin was combined with 1.5 times its weight of nitrocellulose by dissolving the resin and nitrocellulose in butyl acetate, and a film deposited from such a solution was perfectly transparent, showing that the resin and nitrocellulose were compatible. Such a nitrocellulose-resin film had a Sward hardness of 40.

*Example 10.*—A partial rosin ester of technical pentaerythritol having a hydroxyl value of 47.6 per cent, in which 91 per cent of the available hydroxyl radicals or groups were esterified with rosin, was prepared by heating together with constant stirring under an atmosphere of carbon dioxide at 250° C. for 3 hours 250 parts of rosin having an acid number of 162 (approximately 0.725 equivalent proportion) and 28.5 parts (approximately 0.798 equivalent proportion) of the aforesaid technical pentaerythritol. To this was added a previously refluxed mixture of 10.4 parts of phthalic anhydride (approximately 0.070 molecular proportion) and 6.0 parts of butanol (approximately 0.081 molecular proportion), and the whole was further heated for 2 hours at 250° C.

The product was a very light-colored, hard, brittle resin which was compatible with 1.5 times its weight of nitrocellulose when the resin and nitrocellulose were dissolved in butyl acetate and deposited therefrom as a film.

*Example 11.*—The ingredients and procedure of Experiment C were repeated, using the resin prepared according to Example 5. Films deposited on glass or on wood from the lacquer so prepared were completely transparent, hard, and possessed an excellent gloss and a very light color.

It may be seen from the foregoing examples that the ingredients applicable to the practice of the present invention are rather varied. Excellent lacquer resins are obtained by combining these ingredients as illustrated and described, when between approximately 20 per cent and approximately 91 per cent of the available hydroxyl groups of the pentaerythritol-type alcohol is esterified with rosin and the remainder of the hydroxyl groups is esterified with a monohydric alcohol partial ester of a dibasic acid having one free acidic group.

Having thus described my invention, what I claim as new and desire to secure by Letters Patent is:

1. A resin comprising essentially the product of the reaction of rosin, a monohydric alcohol, a polyhydric alcohol selected from the group consisting of pentaerythritol, polypentaerythritols and mixtures thereof, and a polycarboxylic acid selected from the group consisting of succinic, malic, tartaric, maleic, fumaric, citric, glutaric, adipic, pimelic, suberic, azelaic, sebacic, diglycolic, methylene disalicylic, phthalic, isophthalic, terephthalic, tetrahydrophthalic, endomethylene tetrahydrophthalic, diphenic and naphthalic acids and anhydrides, homogues and isomers thereof, the rosin being present in the reaction mixture in a quantity stoichiometrically sufficient for esterification of at least one hydroxyl radical of the polyhydric alcohol and less than approximately 91% of the amount required stoichiometrically for complete esterification of the polyhydric alcohol, and the monohydric alcohol and polycarboxylic acid being present in such stoichiometric proportions relative to each other that all but one carboxyl group of the polycarboxylic acid is esterified and in such total proportions that are stoichiometrically sufficient for esterification of the remaining hydroxyl radicals of the polyhydric alcohol by the carboxyl radical of the polycarboxylic acid that is not esterified by the monohydric alcohol.

2. A resin comprising essentially the product of the reaction of approximately 1 equivalent proportion of a polyhydric alcohol selected from the group consisting of pentaerythritol, polypentaerythritols and mixtures thereof, from approximately 0.25 to approximately 0.91 equivalent proportion of rosin, such an amount of a polycarboxylic acid selected from the group consisting of succinic, malic, tartaric, maleic, fumaric, citric, glutaric, adipic, pimelic, suberic, azelaic, sebacic, diglycolic, methylene disalicylic, phthalic, isophthalic, terephthalic, tetrahydrophthalic, endomethylene tetrahydrophthalic, diphenic and naphthalic acids and anhydrides, homologues and isomers thereof that the molecular proportion of the polycarboxylic acid and the equivalent proportion of the rosin equal approximately 1, and an amount of a monohydric alcohol approximately equal to that amount required stoichiometrically for esterification of all but one of the carboxyl radicals of the polycarboxylic acid.

3. A resin comprising essentially the product of the reaction of rosin, a polyhydric alcohol selected from the group consisting of pentaerythritol, polypentaerythritols and mixtures thereof and a partial ester of a monohydric alcohol and a polycarboxylic acid selected from the group consisting of succinic, malic, tartaric, maleic, fumaric, citric, glutaric, adipic, pimelic, suberic, azelaic, sebacic, diglycolic, methylene disalicylic, phthalic, isophthalic, terephthalic, tetrahydrophthalic, endomethylene tetrahydrophthalic, diphenic and naphthalic acids and homologues and isomers thereof, which partial ester has only one free carboxyl radical in the molecule, the rosin being present in the reaction mixture in a quantity stoichiometrically sufficient for esterification of at least one hydroxyl radical of the polyhydric alcohol and less than approximately 91% of the amount required stoichiometrically for complete esterification of the polyhydric alcohol, and the partial ester of the polycarboxylic acid being present in an amount stoichiometrically sufficient for esterification of the remaining hydroxyl radicals of the polyhydric alcohol.

4. A nitrocellulose-compatible resin which comprises essentially the product of the reaction of approximately 1 equivalent proportion of a polyhydric alcohol selected from the group consisting of pentaerythritol, polypentaerythritols and mixtures thereof, from approximately 0.25 to approximately 0.91 equivalent proportion of rosin, and such a proportion of a half ester of a monohydric alcohol and phthalic acid that the molecular proportion of the half ester and the equivalent proportion of the rosin equal approximately 1.

5. A nitrocellulose-compatible resin which comprises essentially the product of the reaction of approximately 1 equivalent proportion of a polyhydric alcohol selected from the group consisting of pentaerythritol, polypentaerythritols and mixtures thereof, from approximately 0.25 to approximately 0.91 equivalent proportion of rosin, and such a proportion of a half ester of a monohydric alcohol and maleic acid that the molecular proportion of the half ester and the equivalent proportion of the rosin equal approximately 1.

6. A nitrocellulose-compatible resin which comprises essentially pentaerythritol triabietate-mono-(monobutyl phthalate) and is essentially the product of the reaction of approximately 1 molecular proportion of pentaerythritol, approximately 3 molecular proportions of rosin, approximately 1 molecular proportion of butyl alcohol and approximately 1 molecular proportion of phthalic anhydride.

7. A nitrocellulose-compatible resin which comprises essentially dipentaerythritol tetraabietate-di-(monobutyl phthalate) and is essentially the product of the reaction of approximately 1 molecular proportion of dipentaerythritol, approximately 4 molecular proportions of rosin, approximately 2 molecular proportions of butyl alcohol and approximately 2 molecular proportions of phthalic anhydride.

8. A nitrocellulose-compatible resin which comprises essentially pentaerythritol triabietate-mono-(monobutyl maleate) and is essentially the product of the reaction of approximately 1 molecular proportion of pentaerythritol, approximately 3 molecular proportions of rosin, approximately 1 molecular proportion of butyl alcohol and approximately 1 molecular proportion of maleic anhydride.

9. A lacquer comprising nitrocellulose and a resin as defined in claim 1 dissolved in a volatile solvent therefor.

10. A lacquer comprising nitrocellulose and a resin as defined in claim 2 dissolved in a volatile solvent therefor.

11. A lacquer comprising nitrocellulose and a resin as defined in claim 3 dissolved in a volatile solvent therefor.

12. A lacquer comprising nitrocellulose and a resin as defined in claim 4 dissolved in a volatile solvent therefor.

13. A lacquer comprising nitrocellulose and a resin as defined in claim 5 dissolved in a volatile solvent therefor.

14. A lacquer comprising nitrocellulose and a resin as defined in claim 6 dissolved in a volatile solvent therefor.

15. A lacquer comprising nitrocellulose and a resin as defined in claim 7 dissolved in a volatile solvent therefor.

16. A lacquer comprising nitrocellulose and a resin as defined in claim 8 dissolved in a volatile solvent therefor.

17. A process of producing a resin as defined in claim 1, which comprises heating together the specified amounts of the four reactants at a temperature of approximately 145° C. for approximately 9 hours, whereby substantial esterification of the monohydric alcohol and the polycarboxylic acid in the mixture to produce the partial ester is effected, and subsequently heating the reaction mixture at a temperature of approximately 250° C. for approximately 3 hours, whereby substantially complete esterification of the polyhydric alcohol with rosin and the partial ester to produce the resin is effected.

18. A process of producing a resin as defined in claim 1, which comprises heating together the specified amounts of the monohydric alcohol and the polycarboxylic acid at approximately refluxing temperature for such a period that esterification to produce the partial monohydric alcohol-polycarboxylic acid ester has proceeded to a substantial extent, heating the specified amounts of rosin and the polyhydric alcohol together at a temperature of approximately 250° C. for approximately 3 hours, whereby esterification to produce the partial polyhydric alcohol-rosin ester proceeds to a substantial extent, subsequently combining the two reaction mixtures and heating them together at a temperature of approximately 250° C. for approximately 2 hours, whereby substantially complete esterification of the two partial esters with each other to produce the resin is effected.

19. A process of producing a resin as defined in claim 3, which comprises heating together the specified amounts of rosin and the polyhydric alcohol at a temperature of approximately 250° C. for approximately 3 hours, whereby esterification to produce the partial polyhydric alcohol-rosin ester proceeds to a substantial extent, subsequently adding the specified amount of the partial ester of the monohydric alcohol and the polycarboxylic acid and heating the reaction mixture at a temperature of approximately 250° C. for approximately 2 hours, whereby substantially complete esterification of the partial polyhydric alcohol-rosin ester with the partial ester of the monohydric alcohol and the polycarboxylic acid is effected.

20. A process of producing a resin as defined in claim 6, which comprises heating together approximately 1 molecular proportion of butyl alcohol and approximately 1 molecular proportion of phthalic anhydride at approximately refluxing temperature for such a period that a substantial proportion of monobutyl phthalate is produced, heating together approximately 1 molecular proportion of pentaerythritol and approximately 3 molecular proportions of rosin at a temperature of approximately 250° C. for approximately 3 hours, whereby esterification to produce the partial pentaerythritol-rosin ester proceeds to a substantial extent, subsequently combining the two reaction mixtures and heating them together at a temperature of approximately 250° C. for approximately 2 hours, whereby substantially complete esterification of the two partial esters with each other to produce the resin is effected.

21. A process of producing a resin as defined in claim 7, which comprises heating together approximately 2 molecular proportions of butyl alcohol and approximately 2 molecular proportions of phthalic anhydride at approximately refluxing temperature for such a period that a substantial proportion of monobutyl phthalate is produced, heating together approximately 1 molecular proportion of dipentaerythritol and approximately 4 molecular proportions of rosin at a temperature of approximately 250° C. for approximately 3 hours, whereby esterification to produce the partial dipentaerythritol-rosin ester proceeds to a substantial extent, subsequently combining the two reaction mixtures and heating them together at a temperature of approximately 250° C. for approximately 2 hours, whereby substantially complete esterification of the two partial esters with each other to produce the resin is effected.

22. A process of producing a resin as defined in claim 8, which comprises heating together approximately 1 molecular proportion of butyl alcohol and approximately 1 molecular proportion of maleic anhydride at approximately refluxing temperature for such a period that a substantial proportion of monobutyl maleate is produced, heating together approximately 1 molecular proportion of pentaerythritol and approximately 3 molecular proportions of rosin at a temperature of approximately 250° C. for approximately 3 hours, whereby esterification to produce the partial pentaerythritol-rosin ester proceeds to a substantial extent, subsequently combining the two reaction mixtures and heating them together at a temperature of approximately 250° C. for approximately 2 hours, whereby substantially complete esterification of the two partial esters with each other to produce the resin is effected.

HARRY BURRELL.